US009102329B2

(12) United States Patent
Fujita et al.

(10) Patent No.: US 9,102,329 B2
(45) Date of Patent: Aug. 11, 2015

(54) TRACKING CONTROL APPARATUS

(75) Inventors: Kazuyuki Fujita, Gotenba (JP); Hiroki Goto, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/407,349

(22) PCT Filed: Jun. 15, 2012

(86) PCT No.: PCT/JP2012/065395
§ 371 (c)(1),
(2), (4) Date: Dec. 11, 2014

(87) PCT Pub. No.: WO2013/186925
PCT Pub. Date: Dec. 19, 2013

(65) Prior Publication Data
US 2015/0112509 A1    Apr. 23, 2015

(51) Int. Cl.
*G05D 1/02*    (2006.01)
*B60W 30/00*    (2006.01)

(52) U.S. Cl.
CPC ................................. *B60W 30/00* (2013.01)

(58) Field of Classification Search
USPC ........ 701/1, 36, 48, 70, 93, 96, 116, 300, 301
See application file for complete search history.

(56) References Cited

U.S. PATENT DOCUMENTS

| 5,734,344 | A | 3/1998 | Yamada | |
|---|---|---|---|---|
| 2003/0218563 | A1* | 11/2003 | Miyahara | 342/70 |
| 2004/0093141 | A1* | 5/2004 | Rao et al. | 701/45 |
| 2011/0040468 | A1* | 2/2011 | Leineweber et al. | 701/96 |

FOREIGN PATENT DOCUMENTS

| JP | 09-145833 A | 6/1997 |
|---|---|---|
| JP | 2009-222455 A | 10/2009 |

OTHER PUBLICATIONS

International Search Report for PCT/JP2012/065395 dated Sep. 18, 2012.

* cited by examiner

*Primary Examiner* — Kim T Nguyen
(74) *Attorney, Agent, or Firm* — Sughrue Mion, PLLC (57) ABSTRACT

A tracking control apparatus is configured to include a detection unit that detects an object in front of a host vehicle, and a control unit that, when parallel traveling vehicles which travel in parallel with each other in front of the host vehicle are detected by the detection unit and in a case where a distance between the host vehicle and the parallel traveling vehicles is longer than a separate recognition distance by which a plurality of vehicles in the vehicle-width direction can be separately recognized, presumes that there exists a preceding vehicle between the parallel traveling vehicles and controls traveling of the host vehicle.

7 Claims, 12 Drawing Sheets

TRACKING CONTROL APPARATUS

CROSS REFERENCE TO RELATED APPLICATIONS

This application is a National Stage of International Application No. PCT/JP2012/065395 filed Jun. 15, 2012, the contents of all of which are incorporated herein by reference in their entirety.

TECHNICAL FIELD

The present invention relates to a tracking control apparatus.

BACKGROUND ART

In the related art, for example, as disclosed in Patent Literature 1, a tracking control apparatus that controls the traveling of a host vehicle so as to track a preceding vehicle is known. Such an apparatus controls the traveling of the host vehicle by detecting the preceding vehicle traveling in a host lane. Here, the preceding vehicle is detected using an object detection sensor that, for example, transmits a detection wave toward the front direction of the host vehicle and simultaneously receives a detection wave reflected from the object. The object detection sensor detects a distance to the object from the host vehicle, a relative speed of the object with respect to the host vehicle and an angle (a lateral position) between the object and the host vehicle with accuracy according to each resolution of the distance, the speed, and the angle.

CITATION LIST

Patent Literature

[Patent Literature 1] Japanese Unexamined Patent Application Publication No. 2009-22245

SUMMARY OF INVENTION

Technical Problem

Incidentally, in such an apparatus, there is a room for improvement in the point that, when a plurality of vehicles are traveling in front of a host vehicle in parallel, the host vehicle is caused to track the preceding vehicle without giving a discomfort to a driver. That is because a preceding vehicle on a host lane cannot be separately recognized from a parallel traveling vehicle on an adjacent lane depending on an angular resolution of an object detection sensor, and particularly, it becomes more difficult to recognize the parallel traveling vehicle if the distance between the host vehicle and the parallel traveling vehicle becomes greater. Then, in a case where the preceding vehicle is not recognized, there is a case of giving a discomfort to a driver due to a delay in timing of starting the tracking control.

For this reason, an object of the present invention is to provide a tracking control apparatus in which, when a plurality of vehicles are traveling in front of a host vehicle in parallel, the host vehicle can track the preceding vehicle without giving a discomfort to the driver.

Solution to Problem

A tracking control apparatus in the present invention is configured to include: a detection unit that detects an object in front of a host vehicle; and a control unit that, when parallel traveling vehicles which travel in parallel with each other in front of the host vehicle are detected by the detection unit and in a case where a distance between the host vehicle and the parallel traveling vehicles is longer than a separate recognition distance by which a plurality of vehicles in the vehicle-width direction can be separately recognized, presumes that there exists a preceding vehicle between the parallel traveling vehicles and controls traveling of the host vehicle.

According to the tracking control apparatus in the present invention, in a case where the distance between the host vehicle and the parallel traveling vehicles is longer than the separate recognition distance, the traveling of the host vehicle is controlled on the presumption that there exists a preceding vehicle between the parallel traveling vehicles. Accordingly, when a plurality of vehicles travel in front of the host vehicle in parallel, even in a case where the preceding vehicle cannot be recognized separately from the parallel traveling vehicles, it is possible to cause the host vehicle to track the preceding vehicle without delaying the timing of starting the tracking control and without giving a discomfort to the driver.

In addition, in a direction on one side where a vehicle detected as the parallel traveling vehicle exists, in a case where a static object is detected at a position closer to the host vehicle than to the vehicle on that one side, the control unit may not control the traveling of the host vehicle on the presumption that there exists a preceding vehicle. In this way, even in a case where a detection wave reflected via a static object existing on a roadside of the host lane is received, by determining the positional relation between the parallel traveling vehicle and the static object, it is possible to suppress the discomfort related to the tracking control performed on the presumption that the preceding vehicle exists.

In addition, during traveling on a curved road, in a case where a distance difference between a distance between a vehicle detected at the inside of the curved road and the host vehicle and a distance between a vehicle detected at the outside of the curved road and the host vehicle is not equal to or larger than a threshold value, the control unit may not control the traveling of the host vehicle on the presumption that there exists a preceding vehicle. In this way, even in a case where the detection wave reflected via the static object existing on the roadside of the host lane is received when traveling on the curved road, by determining the distance difference generated between a plurality of vehicles detected as the parallel traveling vehicles and the host vehicle, it is possible to suppress the discomfort related to the tracking control performed on the presumption that there exists the preceding vehicle.

The separate recognition distance may be calculated from a vehicle-to-vehicle distance in the vehicle-width direction and an angle resolution of the detection unit. The vehicle-to-vehicle distance may be estimated based on a speed of the host vehicle, and may be estimated based on at least any of a lane width and a vehicle width. In this way, the separate recognition distance can be appropriately calculated.

Advantageous Effects of Invention

According to the present invention, it is possible to provide a tracking control apparatus in which, when a plurality of vehicles are traveling in front of a host vehicle in parallel, the host vehicle can track a preceding vehicle without giving a discomfort to a driver.

DESCRIPTION OF EMBODIMENTS

Hereinafter, embodiments of the present invention will be described in detail with reference to the drawings. In the description of the drawings, the same elements will be referred to by the same reference signs and the descriptions thereof will not be repeated.

Hereinafter, the tracking control apparatus in the first embodiment of the present invention will be described referring to FIG. 1 to FIG. 6. The tracking control apparatus is an apparatus that causes the host vehicle to track a preceding vehicle when a plurality of vehicles are traveling in front of the host vehicle in parallel without giving a discomfort to a driver.

Figure 1:
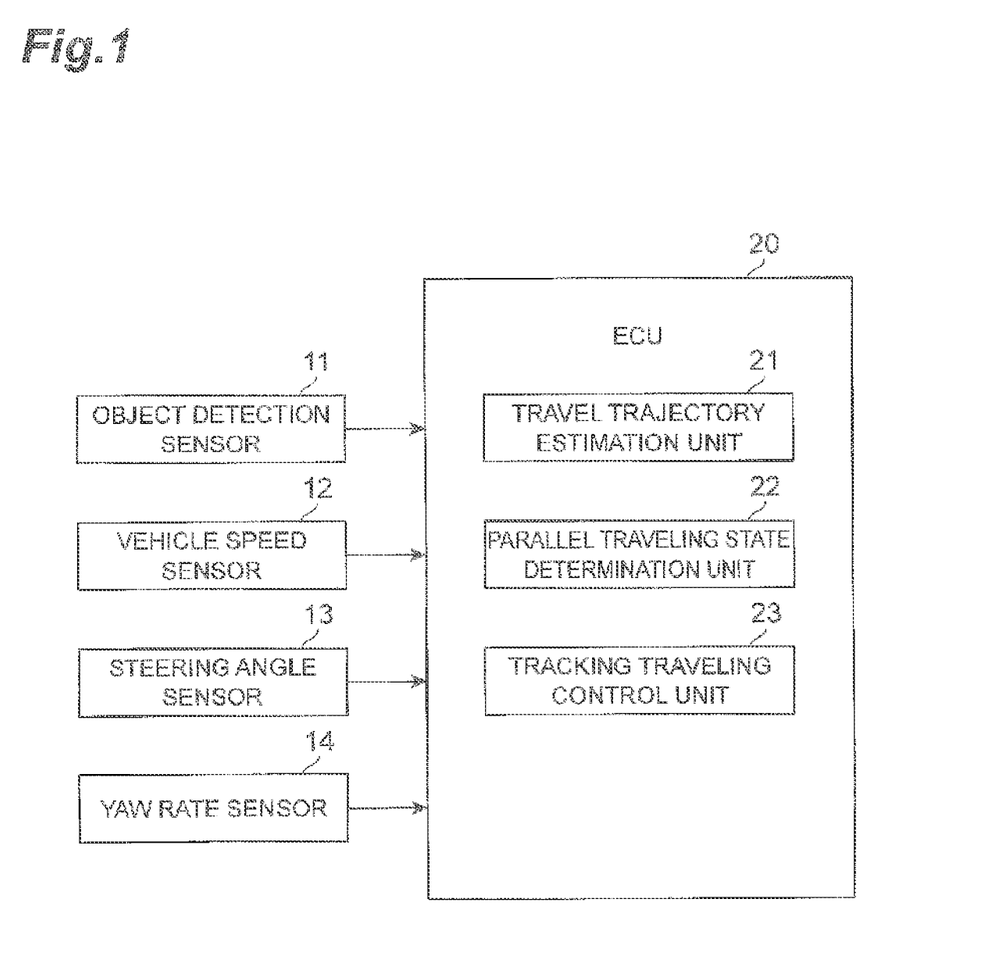
FIG. 1 is a block diagram illustrating a configuration of a tracking control apparatus in a first embodiment of the present invention.

First, a configuration of the tracking control apparatus will be described referring to FIG. 1. FIG. 1 is a block diagram illustrating the configuration of a tracking control apparatus in the first embodiment of the present invention. As illustrated in FIG. 1, the tracking control apparatus includes various sensors 11 to 14, and an electronic control unit (ECU) 20 that is connected to the various sensors 11 to 14. The various sensors 11 to 14 are formed of, for example, an object detection sensor 11, a vehicle speed sensor 12, a steering angle sensor 13, and a yaw rate sensor 14.

The object detection sensor 11 functions as a detection unit that is configured to detect an object in front of the host vehicle. A millimeter-wave radar, a laser radar, or the like are used as the object detection sensor 11. The object detection sensor 11 is an electronic scan type sensor having a transmission antenna and a plurality of reception antennae installed on the front surface of the host vehicle.

The object detection sensor 11 transmits a detection wave toward the front of the host vehicle from the transmission antenna and simultaneously receives the detection wave reflected from the object by the plurality of reception antennae. The object detection sensor 11 detects a distance between the object and the host vehicle, a relative speed of the object with respect to the host vehicle, and an angle (a lateral position) between the object and the host vehicle with accuracy according to each resolution of the distance, the speed, and the angle, and then, supplies the detection result to the ECU 20.

The vehicle speed sensor 12 is a wheel speed sensor or the like that detects a speed of the host vehicle. The steering angle sensor 13 is a sensor that detects a steering angle of the host vehicle. The yaw rate sensor 14 is a sensor that detects a turning angle of the host vehicle. The detection results of the vehicle speed sensor 12, the steering angle sensor 13, and the yaw rate sensor 14 are respectively supplied to the ECU 20.

The ECU 20 includes a travel trajectory estimation unit 21, a parallel traveling state determination unit 22, and a tracking traveling control unit 23. The ECU 20 is mainly formed of a CPU, ROM, RAM, and the like. The CPU functions as the travel trajectory estimation unit 21, the parallel traveling state determination unit 22, and the tracking traveling control unit 23 by reading a program from the ROM or the like and executing the program on the RAM.

The travel trajectory estimation unit 21 is configured to estimate the travel trajectory of the host vehicle. The travel trajectory estimation unit 21 estimates the travel trajectory of the host vehicle based on the detection results of the yaw rate and the steering angle and supplies the estimation result to the parallel traveling state determination unit 22. The travel trajectory is a trajectory in the traveling direction of the host vehicle, and indicates a path through which the host vehicle is expected to travel. When estimating the travel trajectory, map information supplied from a navigation apparatus (not illustrated) may be used.

The parallel traveling state determination unit 22 is configured to determine whether or not a parallel traveling state occurs in front of the host vehicle. The parallel traveling state determination unit 22 determines whether or not the parallel traveling state occurs based on the detection result of the object and the estimation result of the travel trajectory, and supplies the determination result to the tracking traveling control unit 23.

Here, the parallel traveling state means a state in which, in front of the host vehicle, target objects (a parallel traveling vehicle) that travel on both side lanes adjacent to the host lane with the same distance and at the same relative speed with respect to the host vehicle are detected, but a target object (a preceding vehicle) that travels on the host lane is not detected. The target object that travels with the same distance or at the same relative speed includes a target object that is detected as a target object traveling at the same distance or the same relative speed with accuracy according to the resolution of the distance or the speed. In addition, a range of the host lane and the adjacent lane is estimated based on the estimation result of the travel trajectory.

The tracking traveling control unit 23, in a case where a control condition is satisfied at the time when the parallel traveling state occurs, is configured so as to control the traveling of the host vehicle on the presumption that there exists a preceding vehicle between the parallel traveling vehicles. The tracking traveling control unit 23 assumes that there is a preceding vehicle, generates a control signal so as to travel by tracking the preceding vehicle, and supplies the control signal to an engine control ECU which is not illustrated, a brake control ECU, or the like. The preceding vehicle is regarded as a target object that travels on the host lane with the same or substantially the same distance and relative speed as those of the parallel traveling vehicles.

Here, the control condition is satisfied in a case where the distance between the host vehicle and the parallel traveling vehicles is larger than a separate recognition distance in which a plurality of vehicles can be separately recognized in a vehicle-width direction. The separate recognition distance is calculated, for example, from a vehicle-to-vehicle distance in the vehicle-width direction and an angle resolution of the object detection sensor 11.

The angle resolution is an ability of separately recognizing the target objects having the same or substantially the same distance or relative speed, and the smaller value thereof represents the greater separate recognition ability. The vehicle-to-vehicle distance may be estimated, for example, based on the speed of the host vehicle or may be estimated based on at least one of a lane width and a vehicle width. The distance between the host vehicle and the parallel traveling vehicles is represented as a distance in the traveling direction of the host vehicle.

Next, an operation of the tracking control apparatus in the first embodiment will be described referring to FIG. 2 to FIG. 6. First, a situation in which it is not possible to cause the host vehicle to track the preceding vehicle without giving a discomfort to a driver when a plurality of vehicles are traveling in front of a host vehicle in parallel will be described referring to FIG. 2 and FIG. 3.

Figure 2:
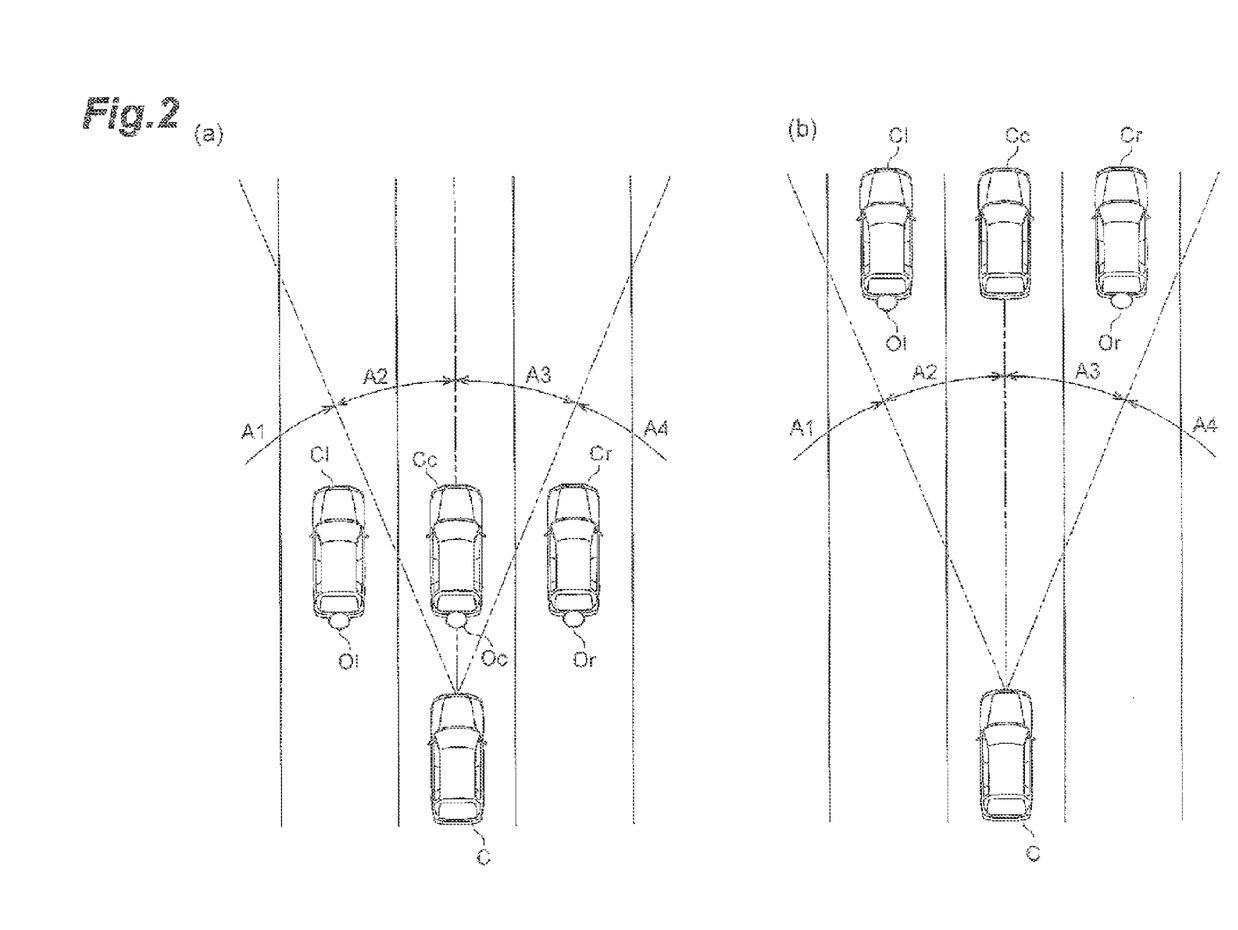
FIG. 2 is a diagram illustrating a positional relation of a vehicle traveling in front of a host vehicle and a detection region of an object detection sensor.
Figure 3:
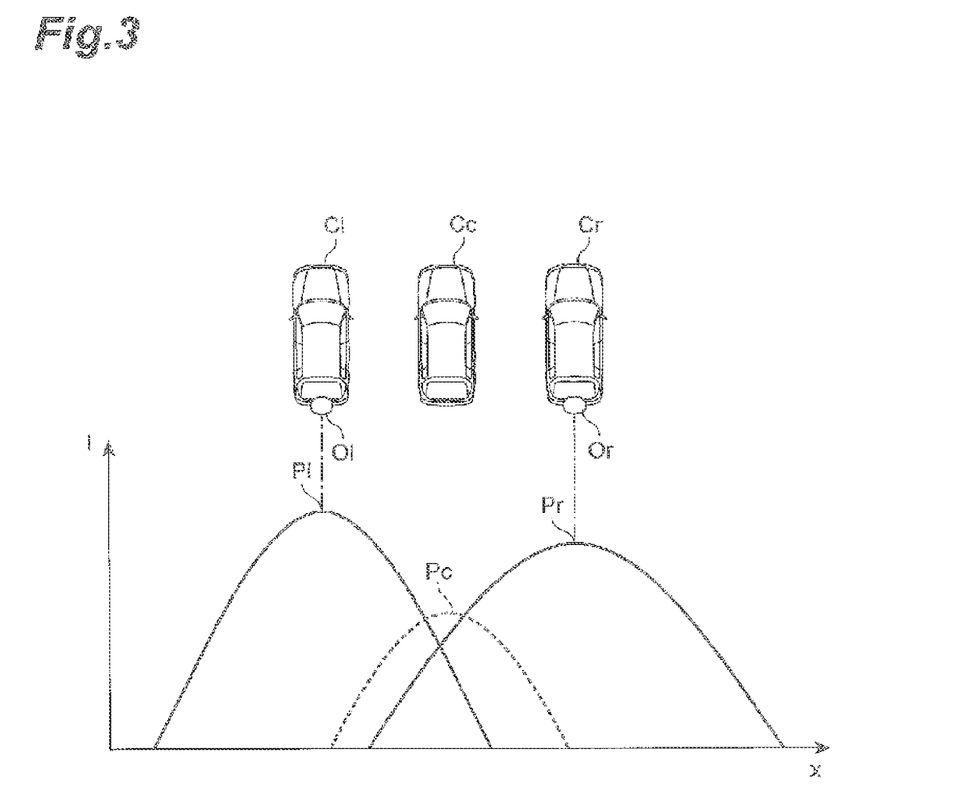
FIG. 3 is a diagram illustrating a detection result of the object detection sensor in a situation illustrated in FIG. 2(b).

FIG. 2 is a diagram illustrating a positional relation of the vehicle traveling in front of the host vehicle and a detection region of the object detection sensor 11. FIG. 3 is a diagram illustrating a detection result of the object detection sensor 11 in the situation illustrated in FIG. 2(b). In FIG. 3, a horizontal axis represents the lateral position x of the object, and a vertical axis represents an intensity I (a reflection intensity) of the detection wave reflected and received from the object.

In FIG. 2(a), vehicles Cl, Cc, and Cr are traveling in front of a host vehicle C with a comparatively short distance. In this positional relation, the parallel traveling vehicles Cl and Cr on the adjacent lane are detected as target objects Ol and Or in detection regions A1 and A4, and a preceding vehicle Cc on the host lane is detected as a target object Oc in detection regions A2 and A3. Accordingly, the traveling of the host vehicle C is appropriately controlled, for example, so as to maintain a constant vehicle-to-vehicle distance based on the result of detecting the preceding vehicle Cc.

On the other hand, in FIG. 2(b), the vehicles Cl, Cc, and Cr are traveling in front of the host vehicle C with a comparatively long distance. In this positional relation, the parallel traveling vehicles Cl and Cr on the adjacent lane are detected as target objects Ol and Or in the detection regions A2 and A3. However, the preceding vehicle Cc on the host lane also exists in the detection regions A2 and A3.

Then, in such a positional relation, particularly, for example, as illustrated in FIG. 3, a peak Pc of the reflection intensity of the preceding vehicle Cc is buried into a peak Pl and a peak Pr of the reflection intensities of the parallel traveling vehicles Cl and Cr, and it is not possible to separately recognize the preceding vehicle Cc from the parallel traveling vehicles Cl and Cr. Accordingly, since the preceding vehicle Cc is not recognized, the timing of starting the tracking control is delayed, and thus, there is a case of giving a discomfort to the driver.

As described above, when the vehicles Cl, Cc, and Cr are traveling in front of the host vehicle C in parallel, in a case where the distance and relative speed between the preceding vehicle Cc and the parallel traveling vehicles Cl and Cr are the same or substantially the same, when the distance between the preceding vehicle Cc and the parallel traveling vehicles Cl and Cr increases, the possibility of not separately recognizing the preceding vehicle Cc from the parallel traveling vehicles Cl and Cr increases depending on the angle resolution of the object detection sensor 11. Then, as a result of the preceding vehicle Cc not being recognized, there is a case where it is not possible to cause the host vehicle C to track the preceding vehicle Cc without giving a discomfort to the driver.

Figure 4:
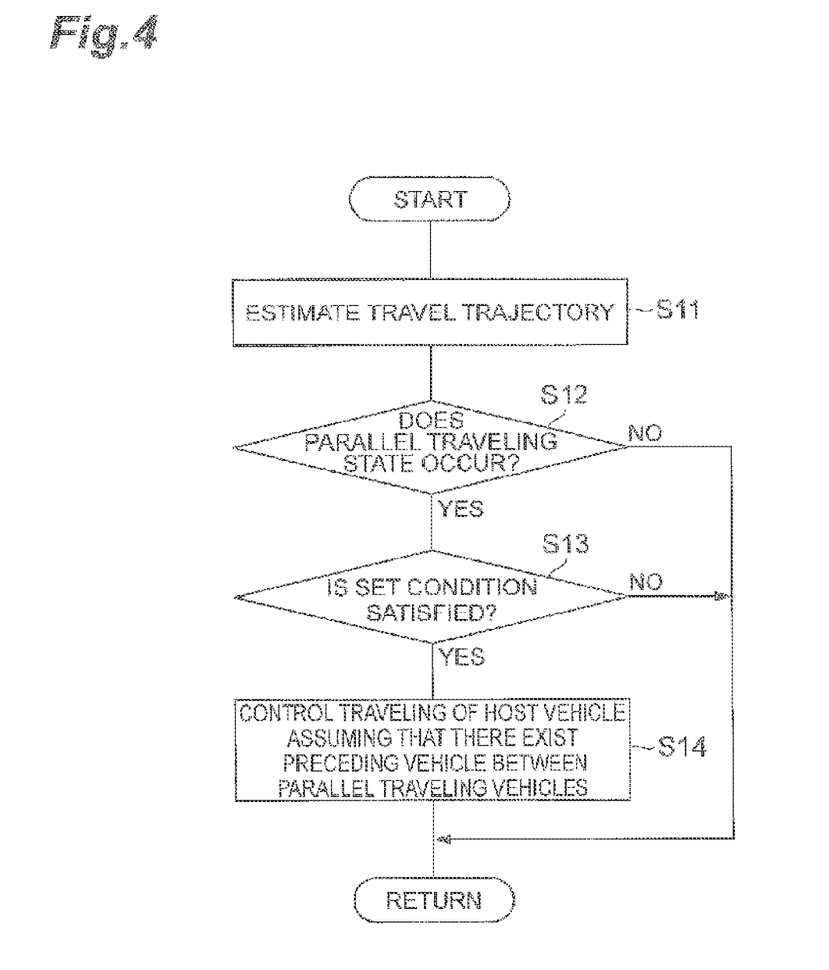
FIG. 4 is a flow chart illustrating an operation of the tracking control apparatus in the first embodiment.
Figure 5:
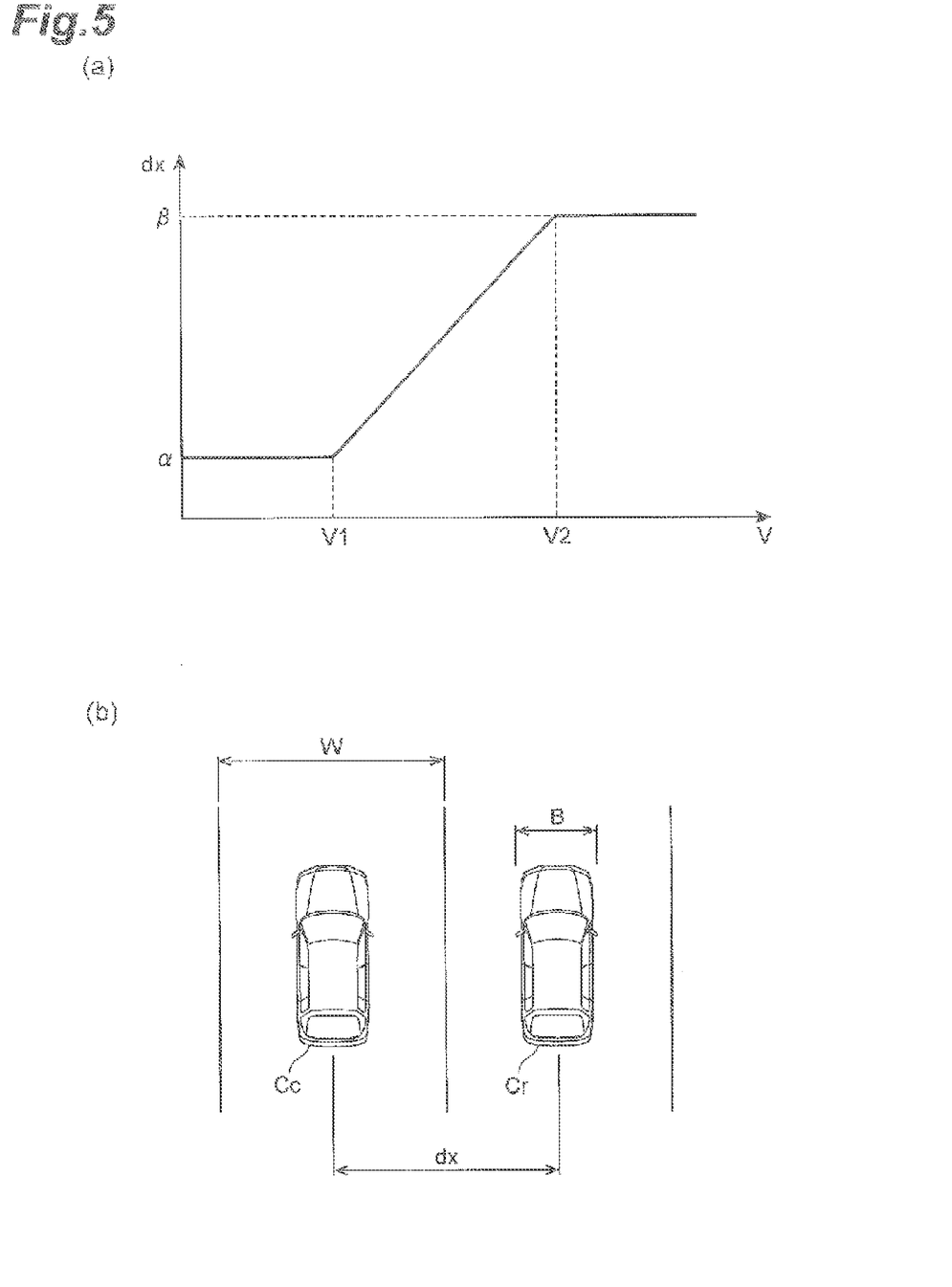
FIG. 5 is a diagram illustrating a method of estimating a vehicle-to-vehicle distance.
Figure 6:
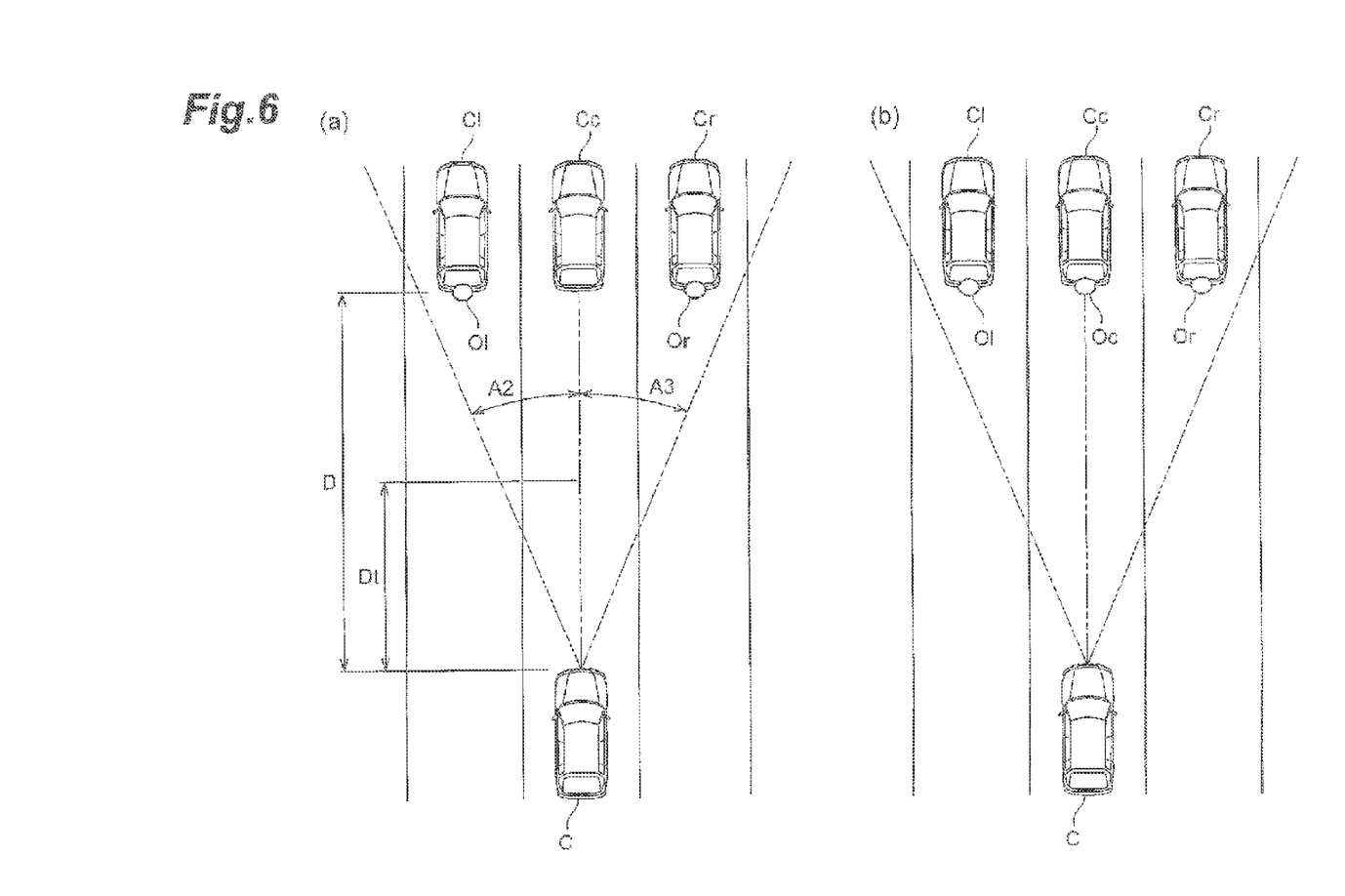
FIG. 6 is a diagram illustrating an assumed example of a preceding vehicle illustrated in a situation in FIG. 2(b).

Next, a method of appropriately controlling the traveling of the host vehicle when a plurality of vehicles are traveling in front of the host vehicle will be described referring to FIG. 4 to FIG. 6. FIG. 4 is a flow chart illustrating the operation of the tracking control apparatus in the first embodiment. FIG. 5 is a diagram illustrating a method of estimating the vehicle-to-vehicle distance. FIG. 6 is a diagram illustrating an assumed example of preceding vehicle Cc in the situation illustrated in FIG. 2(b).

The tracking control apparatus repeatedly performs processing illustrated in FIG. 4 in a processing period. As illustrated in FIG. 4, the travel trajectory estimation unit 21 estimates the travel trajectory of the host vehicle (STEP S11). The travel trajectory is estimated based on the detection result of the steering angle and the yaw rate. In this way, a traveling range on the host lane and the adjacent lane is estimated. The traveling range in a case of traveling on a curved road is also estimated.

Subsequently, the parallel traveling state determination unit 22 determines whether or not a plurality of parallel traveling vehicles traveling in parallel with each other in front of the host vehicle are detected, specifically, whether or not the parallel traveling state occurs (S12). The occurrence of the parallel traveling state is detected based on the detection result of the object and the estimation result of the travel trajectory. That is, the parallel traveling state determination unit 22 determines whether or not the target objects (the parallel traveling vehicles) that travel on both side lanes adjacent to the host lane with the same distance or substantially the same and relative speed with respect to the host vehicle is detected, and whether or not the target object (the preceding vehicle) that travels on the host lane is not detected.

In a case where it is determined that the parallel traveling state occurs, the tracking traveling control unit 23 determines whether or not the control condition is satisfied based on the detection result of the object (S13). That is, the tracking traveling control unit 23 determines whether or not the distance D between the host vehicle and the parallel traveling vehicle is longer than the separate recognition distance Dt. The separate recognition distance Dt is calculated, for example, from the vehicle-to-vehicle distance dx in the vehicle-width direction and the angle resolution X of the object detection sensor 11.

The separate recognition distance Dt can be obtained by Formula Dt=dx/tan(X) based on the vehicle-to-vehicle distance dx estimated between the preceding vehicle which is assumed to exist on the host lane and the parallel traveling vehicles and the angle resolution X (rad) of the object detection sensor 11. Accordingly, the separate recognition distance Dt increases when the vehicle-to-vehicle distance dx increases, and decreases when the angle resolution X increases (the separate recognition ability decreases).

Here, the vehicle-to-vehicle distance dx, for example, as illustrated in FIG. 5(a), is estimated based on the relation between the speed V of the host vehicle and the vehicle-to-vehicle distance dx. This relation represents that, generally, the vehicle-to-vehicle distance to the parallel traveling vehicles increases when the traveling speed of the vehicle increases. Specifically, FIG. 5(a) represents a relation that the vehicle-to-vehicle distance dx is a constant α when the speed is less than V1, and increases from α to β in proportion to the speed when the speed is equal to or higher than V1 and lower than V2, and then, the vehicle-to-vehicle distance dx is a constant β when the speed is equal to or higher than V2. The relation between the speed V and the vehicle-to-vehicle distance dx is not limited to the relation illustrated in FIG. 5(a).

Alternatively, vehicle-to-vehicle distance dx, as illustrated in FIG. 5(b), may be estimated based on lane width information supplied from a navigation apparatus (not illustrated) and a vehicle width B of a general vehicle. The vehicle-to-vehicle distance dx is estimated as a range of 2W-B from B, particularly as W, W-B, or W-B/2 using the lane width W and the vehicle width B. In FIG. 5(b), the vehicle-to-vehicle distance dx is estimated as dx=W.

Referring back to the description in FIG. 4, in case where it is determined that the control condition is satisfied in S13, the tracking traveling control unit 23 controls the traveling of the host vehicle on the presumption that there exists a preceding vehicle between the parallel traveling vehicles (S14). That is, the tracking traveling control unit 23 controls the engine control ECU, the brake control ECU, or the like such that the host vehicle travels by tracking the preceding vehicle.

As an example illustrated in FIG. 6(a), a vehicle is traveling in front of the host vehicle C with a comparatively long distance to the host vehicle C. In this positional relation, the parallel traveling vehicles Cl and Cr on the adjacent lanes are detected at the detection regions A2 and A3 as the target vehicles Ol and Or and the target object Oc (the preceding vehicle Cc) is not detected at the host lane. Therefore, it is determined that a parallel traveling state occurs.

Then, since the distance D between the parallel traveling vehicles Cl and Cr and the host vehicle C is longer than the separate recognition distance Dt, it is determined that the control condition is satisfied. Accordingly, it is estimated that the preceding vehicle Cc traveling between the parallel traveling vehicles Cl and Cr may not possibly be detected. Therefore, as illustrated in FIG. 6(b), it is regarded that, between the parallel traveling vehicles Cl and Cr, there exists the preceding vehicle Cc (the target object Oc) traveling on the host lane with the same or substantially same distance and relative speed as those of the parallel traveling vehicles Cl and Cr with respect to the host vehicle C.

In a case where it is not determined that the parallel traveling state occurs in S12, or it is not determined that the control condition is satisfied in S13, the process ends.

As described above, according to the tracking control apparatus in the first embodiment of the present invention, in a case where the distance between the host vehicle and the parallel traveling vehicles is longer than the separate recognition distance, the traveling of the host vehicle is controlled on the presumption that there exists the preceding vehicle between the parallel traveling vehicles. Accordingly, when a plurality of vehicles travel in parallel in front of the host vehicle, even if the preceding vehicle cannot be recognized separately from the parallel traveling vehicles, it is possible to cause the host vehicle to track the preceding vehicle without delaying the timing of starting the tracking control and without giving a discomfort to the driver.

Figure 7:
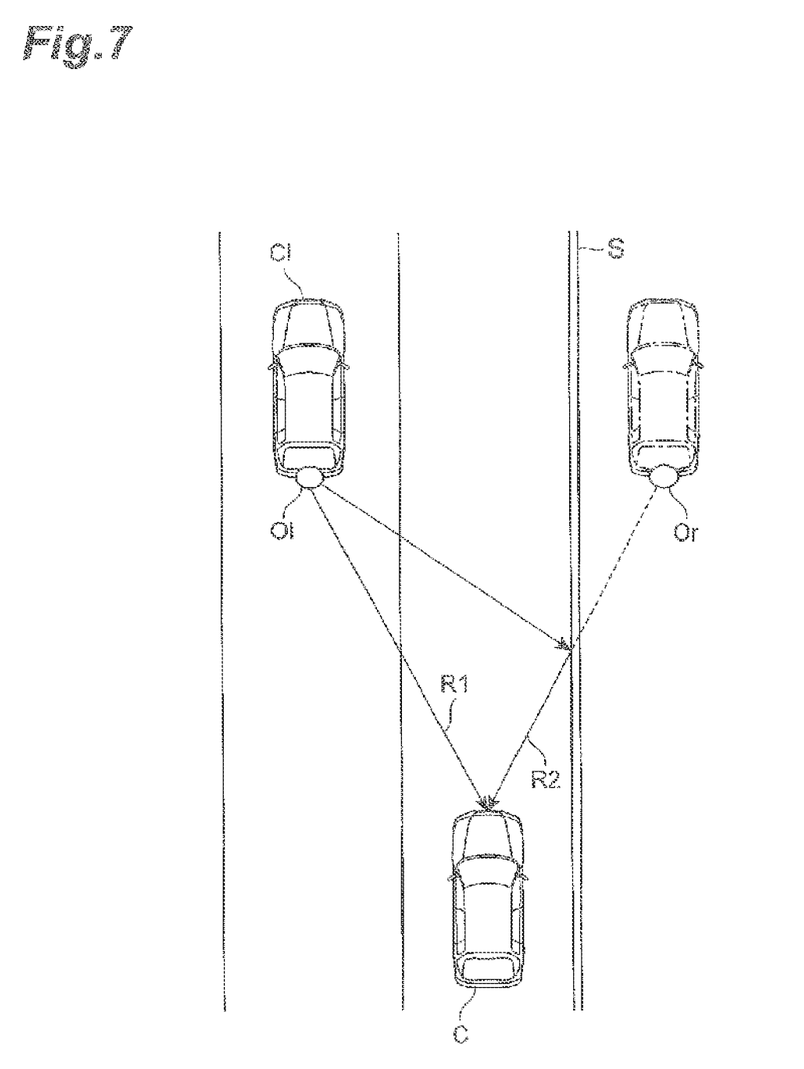
FIG. 7 is a diagram illustrating a situation in which an erroneous determination of a parallel traveling state occurs.

Next, a tracking control apparatus in the second embodiment of the present invention will be described referring to FIG. 7 to FIG. 9. The tracking control apparatus in the second embodiment is characterized by the fact that an erroneous determination of the parallel traveling state is suppressed by determining the positional relation between the parallel traveling vehicle and a static object. The tracking control apparatus in the second embodiment has the same configuration as that in the first embodiment.

First, an erroneous determination of the parallel traveling state will be described referring to FIG. 7. FIG. 7 is a diagram illustrating a situation in which the erroneous determination in the parallel traveling state occurs. In FIG. 7, a vehicle Cl is traveling in front of a left lane of the host vehicle C, and roadside objects S such as a guard rail or a wall exist at the side of a right lane of the host vehicle C. In this situation, there is a case where both of a detection wave R1 (a vehicle reflection wave) which is reflected from the vehicle Cl on the left lane and a detection wave R2 (roadside reflection wave) which is reflected from the vehicle Cl on the left lane and then reflected again from the roadside objects S are received by the object detection sensor 11.

In this case, a target object Ol on the left lane is detected from the vehicle reflection wave R1, and theoretically, a target object Or that is traveling on the right lane with the same or substantially same distance and relative speed with respect to the target object Ol on the left lane and the host vehicle C is detected from the roadside reflection wave R2. It is assumed that a preceding vehicle Cc does not exist on the host lane. Accordingly, a state occurs, in which the target objects Ol and Or (the parallel traveling vehicles Cl and Cr) that travel on both side lanes adjacent to the host lane with the same or substantially the same distance and relative speed are detected, but the target object Oc (the preceding vehicle Cc) traveling on the host lane is not detected, that is, seemingly, the parallel traveling state occurs.

However, the target object Or on the right lane is only a mirror ghost (a virtual image) of the target object Ol on the left lane, but actually the parallel traveling state does not occur. Then, in this situation, if the traveling of the host vehicle is controlled on the presumption that there exists the preceding vehicle Cc on the host lane, there may be a case where a discomfort related to the tracking control such that the host vehicle cannot overtake the vehicle Cl on the left lane is given to the driver.

Next, a method of suppressing the erroneous determination of the parallel traveling state by determining the positional relation between the parallel traveling vehicle and the static object will be described referring to FIG. 8 and FIG. 9. FIG. 8 is a flow chart illustrating an operation of the tracking control apparatus in the second embodiment of the present invention. FIG. 9 is a diagram illustrating the method of suppressing the erroneous determination of the parallel traveling state in the situation illustrated in FIG. 7. The tracking control apparatus performs the processing illustrated in FIG. 8 at the time of performing the processing of S12 illustrated in FIG. 4.

Figure 8:
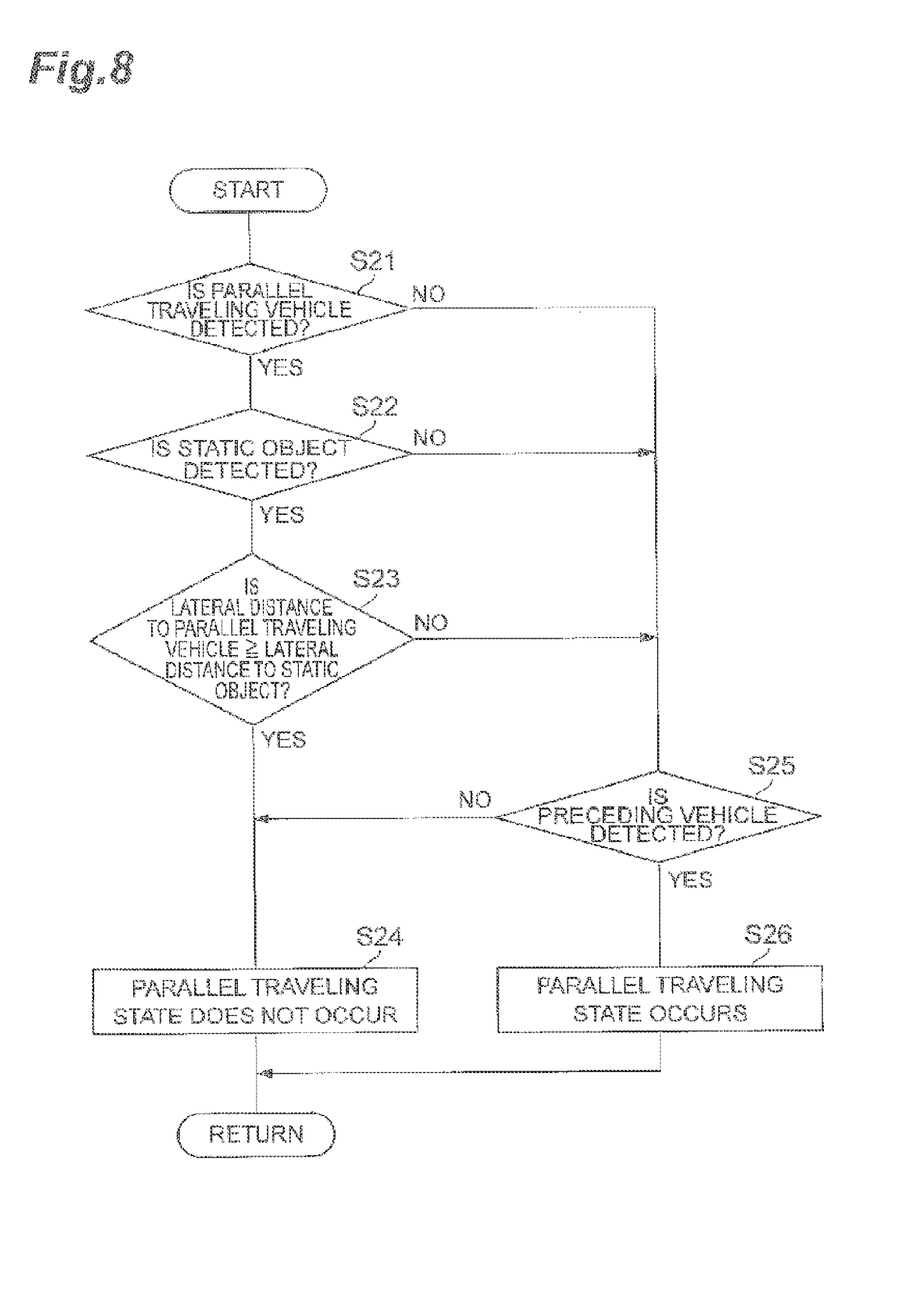
FIG. 8 is a flow chart illustrating an operation of a tracking control apparatus in a second embodiment of the present invention.
Figure 9:
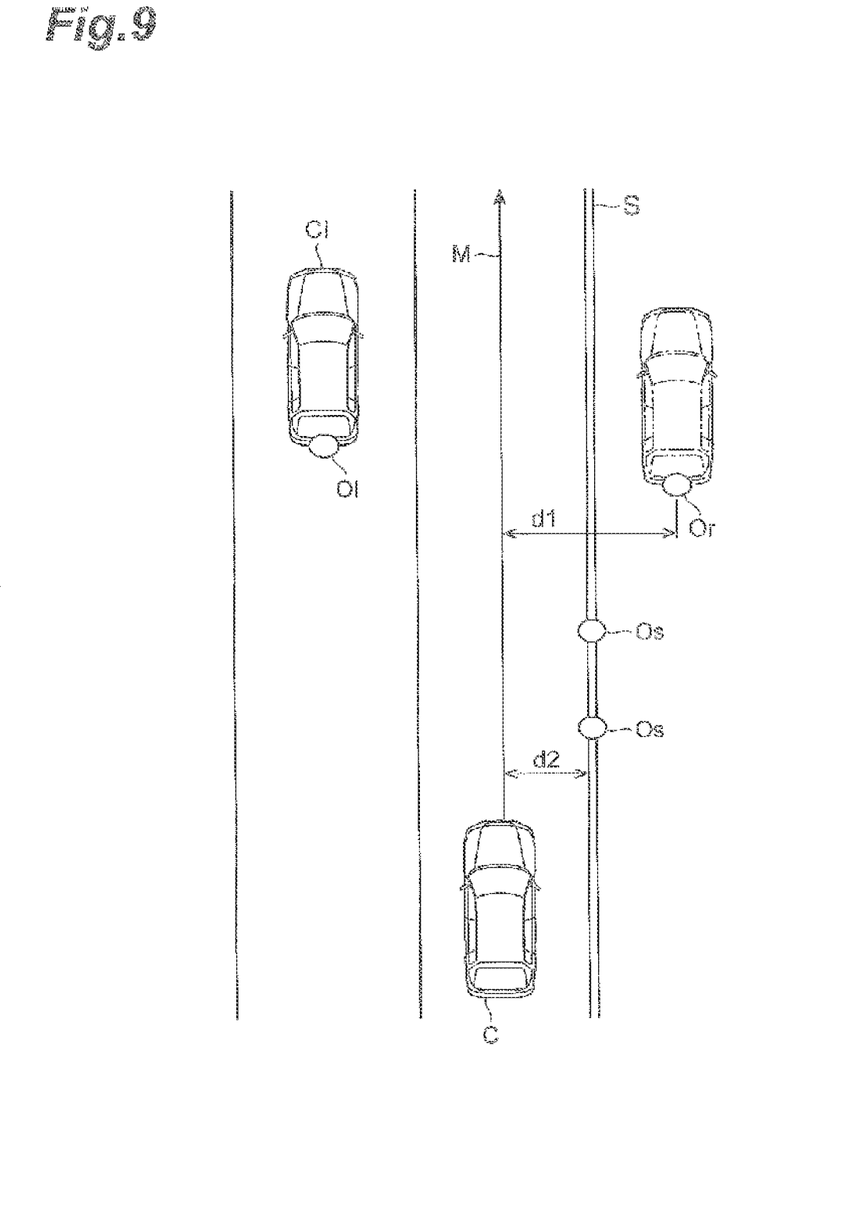
FIG. 9 is a diagram illustrating a method of suppressing the erroneous determination of the parallel traveling state in the situation illustrated in FIG. 7.

As illustrated in FIG. 8, the parallel traveling state determination unit 22 determines whether or not the parallel traveling vehicle is detected in front of the host vehicle (STEP S21). In a case where it is determined that the parallel traveling vehicle is detected, the parallel traveling state determination unit 22 determines whether or not the static object is detected in the direction where the parallel traveling vehicle is detected (S22). As illustrated in FIG. 9, a target object Os of which the relative speed is zero or substantially zero is detected as a static object (roadside object) S.

In a case where it is determined that the static object is detected, the parallel traveling state determination unit 22 determines, with regard to the lane adjacent to the side where the static object is detected, whether or not a lateral distance d1 between the parallel traveling vehicle on the lane and the host vehicle C is equal to or longer than a lateral distance d2 between the static object and the host vehicle C (S23). This means that a property of the mirror ghost in which the roadside object (static object) is detected at the position separated from the host vehicle is used in the determination. The lateral distances d1 and d2 between the parallel traveling vehicle or the static object and the host vehicle are represented as distances in the direction orthogonal or substantially orthogonal to the traveling direction M of the host vehicle.

Then, it is determined that the lateral distance d1 between the parallel traveling vehicle and the host vehicle C is equal to or longer than a lateral distance d2 between the static object and the host vehicle C, the parallel traveling state determination unit 22 determines that the parallel traveling state does not occur (S24). In the example illustrated in FIG. 9, since the lateral distance d1 between the target object Or which is the mirror ghost and the host vehicle is equal to or longer than the lateral distance d2 between the static object S and the host vehicle, it is determined that the parallel traveling state does not occur. Accordingly, by determining the positional relation of the parallel traveling vehicle and the static object, it is possible to suppress the erroneous determination of the parallel traveling state. In addition, even in a case where it is not determined that the parallel traveling vehicle is detected in S21, it is determined that the parallel traveling state does not occur (S24).

On the other hand, in a case where it is not determined that the static object is detected in S22, or in a case where it is not determined that the lateral distance d1 is equal to or longer than the lateral distance d2 in S23, the parallel traveling state determination unit 22 determines whether or not the preceding vehicle is not detected on the host lane (S25). Then, in a case where it is determined that the preceding vehicle is not detected, the parallel traveling state determination unit 22 determines that the parallel traveling state occurs (S26).

As described above, according to the tracking control apparatus in the second embodiment of the present invention, even in a case where the detection wave reflected via the static object existing on the roadside of the host lane is received, by determining the positional relation between the parallel traveling vehicle and the static object, it is possible to suppress the discomfort related to the tracking control performed on the presumption that there exists the preceding vehicle.

In the description above, it is assumed that the mirror ghost occurs on the right lane of the host vehicle, but the same description can be made for a case of the mirror ghost on left lane. In addition, in the description above, it is assumed that the mirror ghost occurs during the traveling on the straight road, but the same description can be made for a case of traveling on a curved road.

Figure 10:
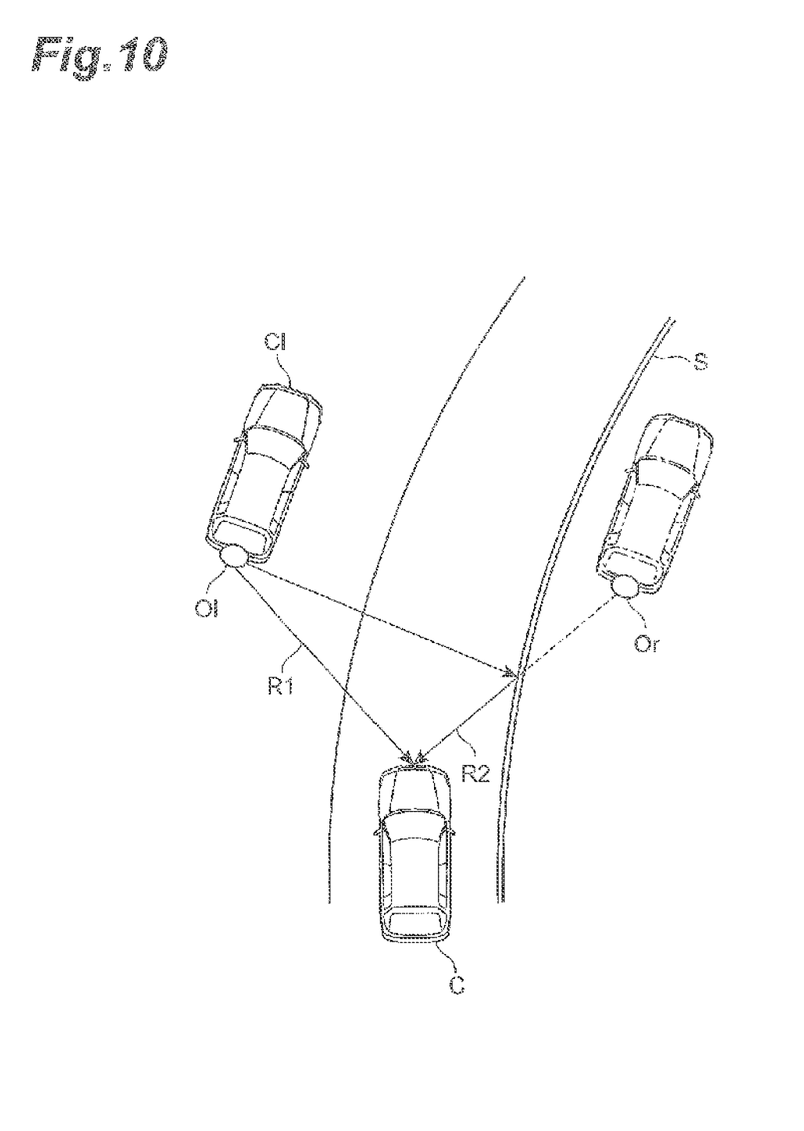
FIG. 10 is a diagram illustrating a situation in which an erroneous determination of a parallel traveling state occurs when the vehicle travels on a curved road.

Next, the tracking control apparatus in the third embodiment of the present invention will be described referring to FIG. 10 to FIG. 12. Hereinafter, the same descriptions as those in the first and second embodiments will not be repeated. The tracking control apparatus in the third embodiment is characterized by the fact that, when the vehicles travel on the curved road, an erroneous determination of the parallel traveling state is suppressed by determining the distance difference generated between a plurality of vehicles detected as the parallel traveling vehicles and the host vehicle. The tracking control apparatus in the third embodiment has a configuration same as that in the first embodiment.

First, an erroneous determination of the parallel traveling state occurring when the vehicle travels on the curved road will be described referring to FIG. 10. FIG. 10 is a diagram illustrating a situation in which an erroneous determination of the parallel traveling state when the vehicle travels on a curved road. In FIG. 10, in the curved road that curves toward the direction right to the traveling direction, a vehicle Cl is traveling in front of the left lane of the host vehicle C and a roadside object S exists on the side of the right lane of the host vehicle C. In this situation also, as similar to the case in the second embodiment, there is a case where the target object Ol on the left lane is detected from the vehicle reflection wave R1, the target object Or traveling on the right lane is detected from the roadside reflection R2, and the target object Oc is not detected on the host lane. Accordingly, seemingly, the parallel traveling state occurs.

However, the target object Or on the right lane is only a mirror ghost (a virtual image) of the target object Ol on the left lane, but actually, the parallel traveling state does not occur. Then, in this situation, if the traveling of the host vehicle is controlled on the presumption that there exists the preceding vehicle Cc on the host lane, there may be a case where such a discomfort related to the tracking control that the host vehicle cannot overtake the vehicle Cl on the left lane is given to the driver.

Next, a method of suppressing the erroneous determination of the parallel traveling state by determining the distance difference generated between a plurality of vehicles detected as the parallel traveling vehicles and the host vehicle will be described referring to FIG. 11 to FIG. 12. FIG. 11 is a flow chart illustrating an operation of the tracking control apparatus in the third embodiment of the present invention. FIG. 12 is a diagram illustrating the method of suppressing the erroneous determination of the parallel traveling state in the situation illustrated in FIG. 10. The tracking control apparatus performs the processing illustrated in FIG. 11 at the time of performing the processing of STEP S12 illustrated in FIG. 4.

Figure 11:
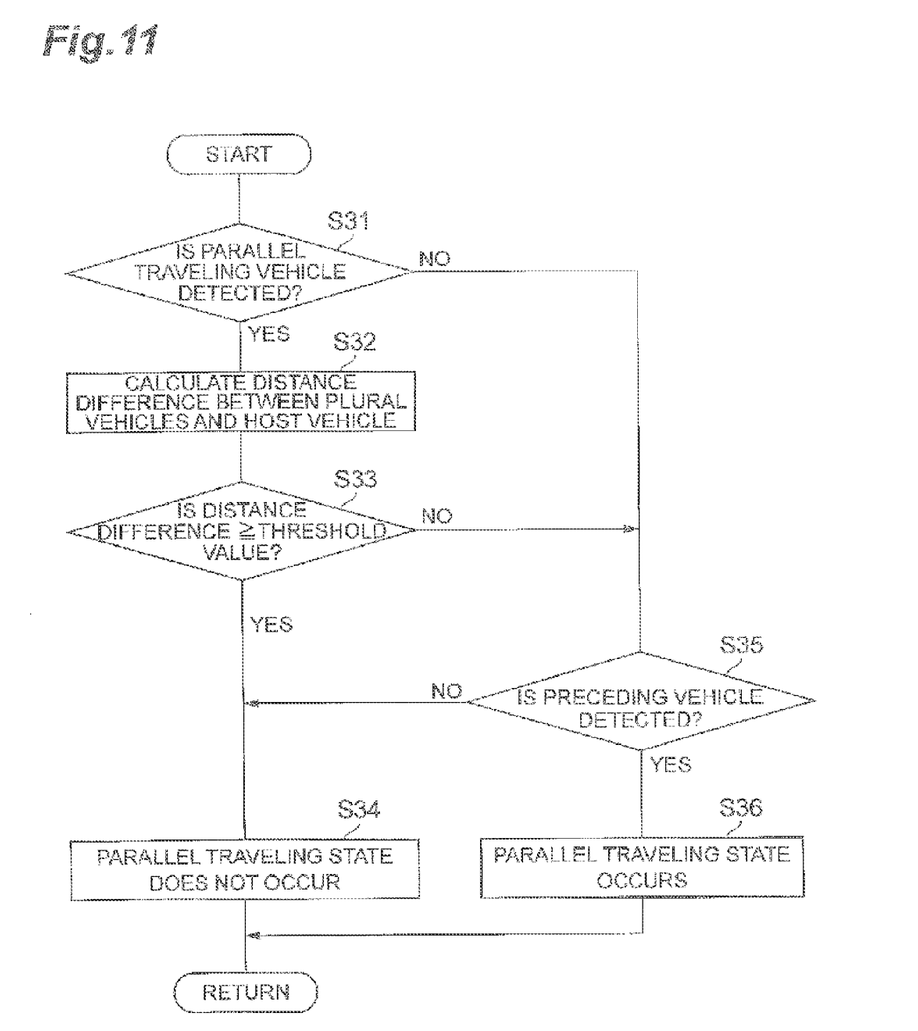
FIG. 11 is a flow chart illustrating an operation of a tracking control apparatus in a third embodiment of the present invention.

As illustrated in FIG. 11, the parallel traveling state determination unit 22 determines whether or not the parallel traveling vehicle is detected in front of the host vehicle (STEP S31).

Figure 12:
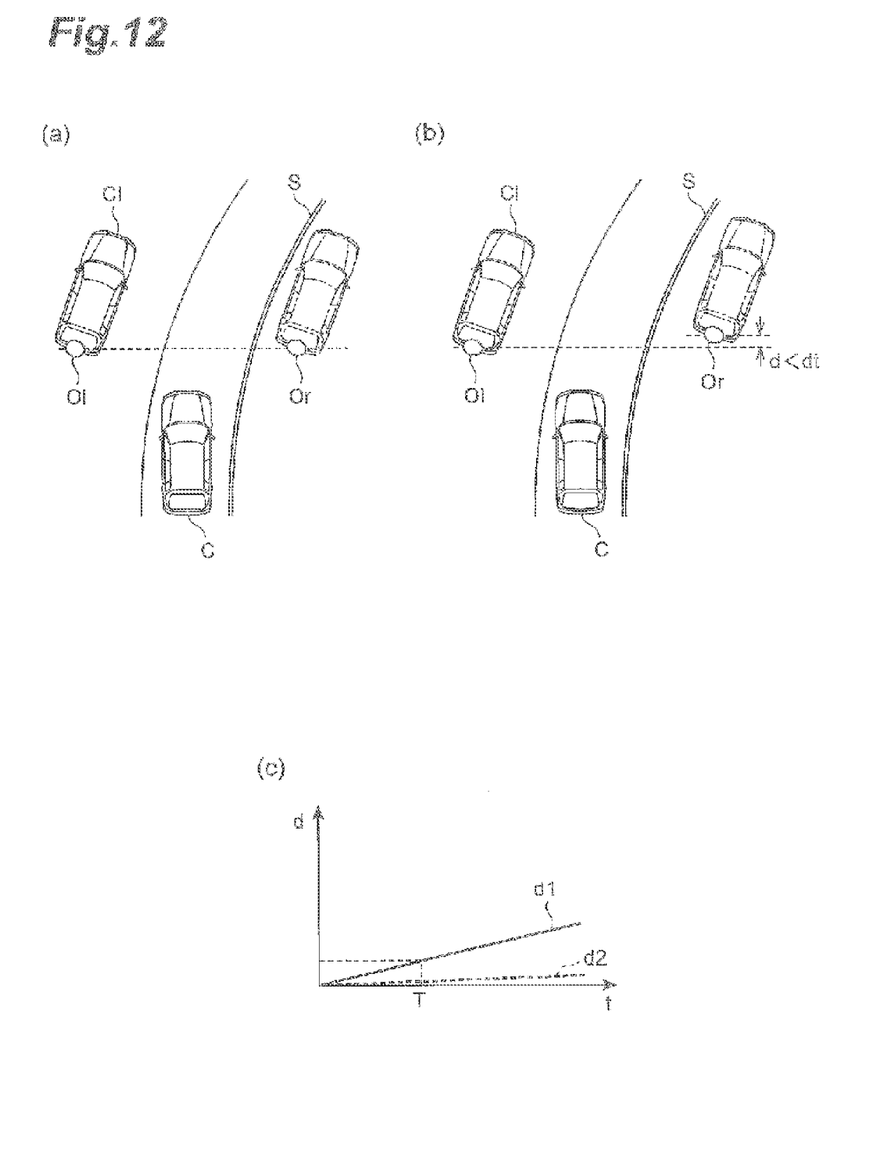
FIG. 12 is a diagram illustrating a method of suppressing the erroneous determination of the parallel traveling state in the situation illustrated in FIG. 10.

In FIG. 12($a$), a situation in which a parallel traveling vehicle is detected is illustrated. In a case where it is determined that the parallel traveling vehicle is detected, the parallel traveling state determination unit 22 calculates a difference d of the distances between a plurality of vehicles detected as the parallel traveling vehicles and the host vehicle (S32). The difference d of the distances means the difference between a change in the distance between one vehicle and the host vehicle and a change in the distance between another vehicle and the host vehicle during a predetermined time after the detection of the parallel traveling vehicles. The difference d of the distances is illustrated in FIG. 12($b$).

Here, the difference d of the distances is calculated by Formula described below using a radius R1 of the curvature at the outside of the curved road, a radius R2 of the curvature at the inside of the curved road, the relative speed V of the parallel traveling vehicle, and the predetermined time T. The radii R1 and R2 of the curvatures can be obtained from the estimation result of the travel trajectory, and the relative speed can be obtained from the detection result of the object detection sensor 11. Of course, instead of the radii R1 and R2 of the curvatures, the curvatures 1/R1 and 1/R2 may be used.

$$d=|R2\times\sin(VT/R2)-R1\times\sin(VT/R1)|$$

Subsequently, the parallel traveling state determination unit 22 determines whether or not the distance difference d is smaller than a threshold value dt (S33). The threshold value is set as illustrated in FIG. 12($c$) which represents the relation between the time t and the distance difference d. In FIG. 12($c$), the distance difference d1 of the vehicles traveling on both sides of the curved road at the same or substantially same speed, and the distance difference d2 between the vehicle traveling one side of the curved road and the mirror ghost detected at the other side of the curved road, are illustrated.

Here, in a case where the vehicles are traveling on both sides of the curved road at the same or substantially same speed, as illustrated in d1 in FIG. 12($c$), due to the difference in radii R1 and R2 of the curvatures, the inside vehicle is farther separated from the host vehicle than from the outside vehicle as the time passes. On the other hand, in a case where the mirror ghost occurs during traveling on the curved road, as illustrated in d2 in FIG. 12(c), even when the time has passed, the distance difference between the distance to the vehicle on one side and the distance to the mirror ghost detected on the other side hardly occurs. Accordingly, if the threshold value dt is set such that the two cases can be distinguished, in a case where the result of the calculation of the distance difference d is smaller than the threshold value dt, it can be estimated that the mirror ghost occurs, and it is possible to determine that the parallel traveling state does not occur.

Then, in a case where it is determined that the distance difference d is smaller than threshold value dt, the parallel traveling state determination unit 22 determines that the parallel traveling state does not occur (S34). Accordingly, by determining the distance difference d between the plurality of vehicles detected as the parallel traveling vehicles and the host vehicle, it is possible to suppress the erroneous determination of the parallel traveling state. In addition, in a case where it is not determined that the parallel traveling vehicle is detected in S31 also, it is determined that the parallel traveling state does not occur (S34).

On the other hand, in a case where it is not determined that the distance difference d is smaller than threshold value dt in S33, the parallel traveling state determination unit 22 determines whether or not the preceding vehicle is detected on the host lane (S35). Then, in a case where it is determined that the preceding vehicle is not detected, the parallel traveling state determination unit 22 determines that the parallel traveling state occurs (S36).

As described above, according to the tracking control apparatus in the third embodiment of the present invention, when the vehicles travel on the curved road, even in a case where the detection wave reflected via the static object existing on the roadside of the host lane is received, by determining the distance difference generated between a plurality of vehicles detected as the parallel traveling vehicles and the host vehicle, it is possible to suppress the discomfort related to the tracking control performed on the presumption that there exists the preceding vehicle. In addition, even in a case where the static objet cannot be detected, it is possible to suppress the discomfort related to the tracking control based on the distance between the parallel traveling vehicle and the host vehicle.

In the description above, it is assumed that the mirror ghost occurs on the right lane of the host vehicle. However, a case where the mirror ghost occurs on the left lane of the host vehicle can be described similarly.

In the embodiments described above, the best mode of the embodiments of the tracking control apparatus in the present invention is described, and the tracking control apparatus in the present invention is not limited to the present embodiments. The tracking control apparatus in the present invention may be modified without departing from the spirit of the claims attached hereto, or may be an apparatus that is applied to other apparatuses.

For example, in the embodiments described above, a case of controlling the traveling of the host vehicle with the assumed preceding vehicle as the tracking target is described. However, the traveling of the host vehicle may be controlled with a region between the parallel traveling vehicles as the tracking target instead of the preceding vehicle.

In addition, according to the above described method, the present invention can also be similarly applied to a program for appropriately controlling the traveling of the host vehicle when a plurality of vehicles are travelling in front of the host vehicle in parallel, or to a computer readable recording medium in which the program is stored.

REFERENCE SIGNS LIST

11 object detection sensor
12 vehicle speed sensor
13 steering angle sensor
14 yaw rate sensor
20 ECU
21 travel trajectory estimation unit
22 parallel traveling state determination unit
23 tracking traveling control unit
C host vehicle
Cl, Cr parallel traveling vehicle
Cc preceding vehicle

The invention claimed is:

1. A tracking control apparatus comprising:
a detection unit that detects an object in front of a host vehicle; and
a control unit that, when parallel traveling vehicles which travel in parallel with each other in front of the host vehicle are detected by the detection unit and in a case where a distance between the host vehicle and the parallel traveling vehicles is longer than a separate recognition distance by which a plurality of vehicles in the vehicle-width direction can be separately recognized, presumes that there exists a preceding vehicle between the parallel traveling vehicles and controls traveling of the host vehicle.

2. The tracking control apparatus according to claim 1, wherein, in a direction on one side where a vehicle detected as the parallel traveling vehicle exists, in a case where a static object is detected at a position closer to the host vehicle than to the vehicle on that one side, the control unit does not control the traveling of the host vehicle on the presumption that there exists a preceding vehicle.

3. The tracking control apparatus according to claim 1, wherein, during traveling on a curved road, in a case where a distance difference between a distance between a vehicle detected at inside of the curved road and the host vehicle and a distance between a vehicle detected at outside of the curved road and the host vehicle is not equal to or larger than a threshold value, the control unit does not control the traveling of the host vehicle on the presumption that there exists a preceding vehicle.

4. The tracking control apparatus claim 1, wherein the separate recognition distance is calculated from a vehicle-to-vehicle distance in the vehicle-width direction and an angle resolution of the detection unit.

5. The tracking control apparatus according to claim 4, wherein the vehicle-to-vehicle distance is estimated based on a speed of the host vehicle.

6. The tracking control apparatus according to claim 4, wherein the vehicle-to-vehicle distance is estimated based on at least any of a lane width and a vehicle width.

7. The tracking control apparatus according to claim 1, wherein the parallel traveling vehicles are detected as a plurality of vehicles which travel on both lanes adjacent to a traveling lane of the host vehicle with the same distance and at the same speed with respect to the host vehicle.

* * * * *